United States Patent
Beer et al.

(10) Patent No.: US 11,614,534 B2
(45) Date of Patent: Mar. 28, 2023

(54) UAV GROUND PENETRATING RADAR ARRAY

(71) Applicant: Lawrence Livermore National Security, LLC, Livermore, CA (US)

(72) Inventors: N. Reginald Beer, Pleasanton, CA (US); Steven Bond, Livermore, CA (US); Peter C. Haugen, Livermore, CA (US); Jacob Trueblood, Dublin, CA (US); Brian Matthew Wihl, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 588 days.

(21) Appl. No.: 16/779,339

(22) Filed: Jan. 31, 2020

(65) Prior Publication Data
US 2023/0054822 A1   Feb. 23, 2023

(51) Int. Cl.
| | | |
|---|---|---|
| *G01S 13/88* | (2006.01) | |
| *G01V 3/12* | (2006.01) | |
| *G01S 13/87* | (2006.01) | |
| *G01S 13/00* | (2006.01) | |
| *G01S 13/02* | (2006.01) | |
| *G01S 13/89* | (2006.01) | |

(52) U.S. Cl.
CPC .......... *G01S 13/885* (2013.01); *G01S 13/003* (2013.01); *G01S 13/0209* (2013.01); *G01S 13/87* (2013.01); *G01S 13/89* (2013.01); *G01V 3/12* (2013.01)

(58) Field of Classification Search
CPC ........ G01S 13/931; G01S 7/023; G01S 7/354; G01S 7/352; G01S 7/356; G01S 13/48; G01S 13/346; G01S 7/41; G01S 7/40; G01S 7/527; H04W 72/082

See application file for complete search history.

(56) References Cited

U.S. PATENT DOCUMENTS

| | | | |
|---|---|---|---|
| 6,031,483 A | 2/2000 | Urabe et al. | |
| 6,218,979 B1 | 4/2001 | Barnes et al. | |
| 6,738,563 B1 * | 5/2004 | Hager | G01S 7/292 342/174 |
| 7,474,257 B2 * | 1/2009 | Blunt | G01S 13/282 342/134 |
| 8,766,845 B2 | 7/2014 | Hallquist et al. | |

(Continued)

OTHER PUBLICATIONS

Paglieroni, W., D., et al., "Imaging Modes for Ground Penetrating Radar and Their Relation to Detection Performance," IEEE Journal of Selected Topics in Applied Earth Observations and Remote Sensing, vol. 8, No. 3, Mar. 2015.

(Continued)

*Primary Examiner* — Olumide Ajibade Akonai
(74) *Attorney, Agent, or Firm* — Perkins Coie LLP (57) ABSTRACT

A GPR system the implements a modified multistatic mode of operation is provided. The GPR is suitable for mounting on an unmanned aerial vehicle. The GPR system has radar transceivers. The GPR system transmits transmit signal serially via the transceivers. For each transceiver that transmits a transmit signal, the GPR system receives a return signal acquired by each transceiver except for a return signal for the transceiver that transmits the transmit signal. The GPR system outputs of matrix of return signals that includes a null value for the return signals of the transceivers that transmit.

15 Claims, 6 Drawing Sheets

(56) References Cited

U.S. PATENT DOCUMENTS

| | | |
|---|---|---|
| 10,353,052 B2 | 7/2019 | Beer et al. |
| 11,181,611 B2 * | 11/2021 | Lim .................. G01S 13/32 |
| 2009/0121918 A1 * | 5/2009 | Shirai ................ G01S 7/023 |
| | | 342/159 |
| 2011/0115666 A1 | 5/2011 | Feigin et al. |
| 2011/0115680 A1 | 5/2011 | Phan et al. |
| 2014/0032116 A1 | 1/2014 | Guner et al. |
| 2016/0069992 A1 | 3/2016 | Rector et al. |
| 2017/0301988 A1 | 10/2017 | Schuman |
| 2019/0064362 A1 | 2/2019 | Scott |
| 2020/0116851 A1 * | 4/2020 | Raghavan .......... G01S 13/5246 |

OTHER PUBLICATIONS

International Search Report and Written Opinion received in Application No. PCT/US21/16008, dated Aug. 17, 2021, 16 pages.

* cited by examiner

FIG. 1

|   | Tx | | | | | | | |
|---|---|---|---|---|---|---|---|---|
|   | 1 | 2 | 3 | 4 | 5 | 6 | 7 | 8 |
| 1 | ∅ | Rx | Rx | Rx | Rx | Rx | Rx | Rx |
| 2 | Rx | ∅ | Rx | Rx | Rx | Rx | Rx | Rx |
| 3 | Rx | Rx | ∅ | Rx | Rx | Rx | Rx | Rx |
| 4 | Rx | Rx | Rx | ∅ | Rx | Rx | Rx | Rx |
| 5 | Rx | Rx | Rx | Rx | ∅ | Rx | Rx | Rx |
| 6 | Rx | Rx | Rx | Rx | Rx | ∅ | Rx | Rx |
| 7 | Rx | Rx | Rx | Rx | Rx | Rx | ∅ | Rx |
| 8 | Rx | Rx | Rx | Rx | Rx | Rx | Rx | ∅ |

Rx (row label)

UAV GROUND PENETRATING RADAR ARRAY

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many scientific, engineering, medical, and other technologies seek to identify the presence of an object within a medium. For example, some technologies detect the presence of buried landmines in a roadway or a field for military or humanitarian purposes. Such technologies may use ultra-wideband ground-penetrating radar ("GPR") antennas that are mounted on the front of a vehicle that travels on the roadway or across the field. The antennas are directed into the ground with the soil being the medium and the top of the soil or pavement being the surface. GPR systems can be used to detect not only metallic objects but also non-metallic objects whose dielectric properties are sufficiently different from those of the soil. When a radar signal strikes a subsurface object, it is reflected back as a return signal to a receiver. Current GPR systems typically analyze the strength or amplitude of the return signals directly to identify the presence of the object. Some GPR systems may, however, generate tomography images from the return signals. In the engineering field, GPR systems have been designed to generate spatial images of the interior of concrete structures such as bridges, dams, and containment vessels to assist in assessing the integrity of the structures. In such images, the subsurface objects represented by such images tend to appear as distinct bright spots. In addition to referring to a foreign object that is within a medium, the term "object" also refers to any characteristic of the medium (e.g., crack in the medium and change in medium density) that is to be detected.

The linear array (or more generally array) of a GPR systems may have different modes of operation: monostatic, multi-monostatic, and multistatic. In monostatic mode, the signal transmitted by a transmitter is received only by the receiver of that same transceiver. In multi-monostatic mode, the transceivers of a linear array operate in the monostatic mode in sequence. In multistatic mode, each transceiver transmits in sequence and all the transceiver collects that return signal. When in multistatic mode, the transceivers are in transmit mode sequentially and for each transmitted signal, each switch to receive mode in parallel to receive a return signal. If the linear array has N transceivers, then N return signals in multi-monostatic mode and $N^2$ return signals in multistatic mode are collected.

The use of a GPR system with land-based vehicles can be problematic for several reasons. For example, a land-based vehicle may not be able to detect a buried landmine soon enough to prevent its detonation. As another example, a land-based vehicle may not navigate rough terrain (e.g., mountainous) to collect data. Also, a land-based vehicle may take too long to travel to area to be scanned. To overcome limitations of such land-based vehicles, unmanned aerial vehicles ("UAVs"), also referred to as unmanned aircraft systems ("UAS") or drones, have been employed. Unfortunately, because of the size, weight, and power requirements for operating a GPR system, the UAVs with a GPR system need to be both powerful and large. Such UAVs tend to be very expensive, special-purpose UAVs. Commodity UAVs, which tend to be low-cost, light, and inexpensive, cannot carry such GPR systems.

DETAILED DESCRIPTION

In some embodiment, a modified multistatic array ("MMA") system provides an architecture for a GPR system that can be implemented with a size, weight (e.g., 3 kg), and power that is suitable to be carried by UAVs that, for example, weighs only 10 kg. Current GPR systems that support multistatic mode include precise timing electronics to ensure that when a transceiver transmits a signal in transmit mode, the transceiver can be switched to receive mode at a precise time that is long enough to prevent the return signal from being saturated by the transmitted signal but that is short enough to capture the return signal. Such precise timing electronics tends to be large, heavy, and consume a considerable amount of power. Moreover, the precise timing electronics of a GPR system that supports multistatic mode may need to be replicated for each transceiver, which further increases the size, weight, and power requirements.

The MMA system avoids the need for such precise timing electronics by operating the array of transceivers in a "modified multistatic mode". The modified multistatic mode allows a GPR system to transmit signals via the transceivers of a GPR array in sequence and collect return signals via each transceiver other than for the transceiver that transmitted the transmit signal. For example, if a GPR array has eight transceivers (i.e., 1-8), the MMA system transmits a transmit signal via transceiver 1 and receives the return signals via transceivers 2-8. The MMA system then transmits a transmit signal via transceiver 2 and receives the return signals via transceivers 1 and 3-8. The MMA system then transmits a transmit signal via transceiver 3 and receives the return signals via transceivers 1-2 and 4-8. The MMA system then continues to transmit signals via transceivers 4-8 in sequence and receive return signals via transceivers other than the transmitting transceiver. When complete, the MMA system has received 7 return signals for each transceiver, which can be represented by an 8×8 matrix with diagonal elements containing a null value (e.g., a zero value or a value that is ignore in subsequent processing for a total 56 (i.e., 64−8) return signals. The matrix can then be employed to identify objects within the medium.

Because the return signals are not collected by the transceivers that transmit, the MMA system does not require the precise timing electronics needed to support a multistatic mode of operation. As a result, the size, weight, and power requirements needed to operate in the modified multistatic mode is much less than needed to operate in multistatic mode. The MMA system can thus be deployed on a UAV that is much smaller, lighter, and cheaper than the UAVs needed to support multistatic mode. Moreover, any difference in accuracy of object detection using modified multistatic mode and multistatic mode is small enough that the use of modified multistatic mode in many application environments produces results that are substantially equivalent to results produced using multistatic mode. In addition, although the MMA system can be deployed in a GPR system with a separate transmit antenna and receive antenna for each transceiver, the MMA system can also be deployed in a GPR system with a single antenna for each transceiver with a switch to control whether the antenna is in transmit or receive mode. The use of a single antenna for each transceiver further reduces the size and weight of a GPR system.

In some embodiments, a pre-compensation ("PC") system applies a PC technique to a transmit signal to generate a PC transmit signal that results in a desired return signal. For example, the desired return signal for a GPR system may be flat except for a peak corresponding to a bounce from the surface of the ground. When the PC transmit signal is transmitted with no clutter below the surface, the return signal will be approximately the desired return signal. When the PC transmit signal is transmitted with clutter below the surface, the return signal will have a peak for the surface and peaks corresponding to the clutter. By using a PC transmit signal, the GPR system can better differentiate the return signals from the surface and the clutter—resulting in better object detection.

To generate a PC transmit signal, the PC system transmits a transmit signal and collects a return signal given standard environmental conditions. Standard environment conditions may be, for example, a roadway with no subsurface clutter. The return signal may be considered to be a version of the transmit signal that is degraded by environmental conditions such as noise and object reflections. The PC system then generates a transfer function that inputs the transmit signal and outputs the return signal. For example, the PC system may employ Weiner filter estimation techniques (e.g., Weiner deconvolution) to generate the transfer function. After the transfer function is generated, the PC system may employ various techniques to identify a PC transmit signal that would result in the desired return signal. For example, the PC system may repeatedly adjust a PC transmit signal, apply the transfer function to the adjusted PC transmit signal to generate a return signal, and generate a similarity score indicating similarity between the return signal and the desired return signal. The PC system may generate the adjustments using a minimization technique to identify adjustments that result in the return signal converging on the desired return signal. When the similarity score exceeds a similarity threshold (e.g., the return signal converges on the desired return signal), the PC transmit signal can be transmitted given standard environmental conditions, and the return signal will be the approximately desired return signal.

A GPR system may employ an arbitrary waveform generator to generate the PC transmit signal. Once the PC system generates the PC transmit signal, the PC system can provide the PC transmit signal (e.g., signature of the signal) to the arbitrary waveform generator to generate the PC transmit signal for the GPR system.

The PC system may be embedded with the GPR system and implemented using a processor, a field programmable gate array, an application-specific integrated circuit, and so on. The PC system may regenerate PC transmit signals in real-time, for example, as the GPR system encounters different environmental conditions or periodically. In this way, the PC transmit signal can be dynamically adapted to the current environmental conditions.

The PC system may be used in systems other than GPR system such as cellular communication systems (e.g., 4G and 5G). When used in a cellular communication system, a cell tower may use the PC system to generate a PC transmit signal that is adapted to the environmental conditions encountered when that cell tower transmits to another cell tower. Initially, the PC system of the cell tower transmits a transmit signal to the other cell tower. The other cell tower can then send to the transmitting cell tower the receive signal that it received. The PC system at the cell tower can then generate the PC transmit signal from the transmit signal and the receive signal sent by the other cell tower. The cell tower can use the PC transmit signal in subsequent communications with the other cell tower. Alternatively, the other cell tower upon receiving the receive signal, assuming it knows the transmit signal, can employ the PC system to generate the PC transmit signal and send the PC transmit signal to the cell tower for subsequent use by that cell tower.

Although the MMA system and the PC system are described primarily in the context of a radar array with the same number of transmitters and receivers (N-by-N), the systems may be employed with radar arrays that have different number of transmitters and receivers (N-by-M). For example, a radar array may have 8 transceivers, but only two transceivers may be enabled to transmit such as the first and the eighth transceivers. When the first transceiver transmits, the transceivers other that the first transceiver (i.e., the second through the eighth) receive the return signal. Similarly, when the eighth transceiver transmits, the transceivers other than the eighth transceiver (i.e., the first through the seventh) receive the return signal. In such a case, the return signals may be represented by an N-by-M matrix with the return signal for the transceiver that transmits set to a null value. In addition, the MMA architecture described below can be reconfigured (e.g., by reprogramming the processor of the controller, reconfiguring an FPGA of the controller, or replacing the controller) to transmit only using selected transceivers and to receive on one or more transceivers that do not include the transmitting transceivers. In this way, the operation of a radar array can be tailored as needed to achieve the desired objective without the need to change the hardware of the radar system.

Figure 1:
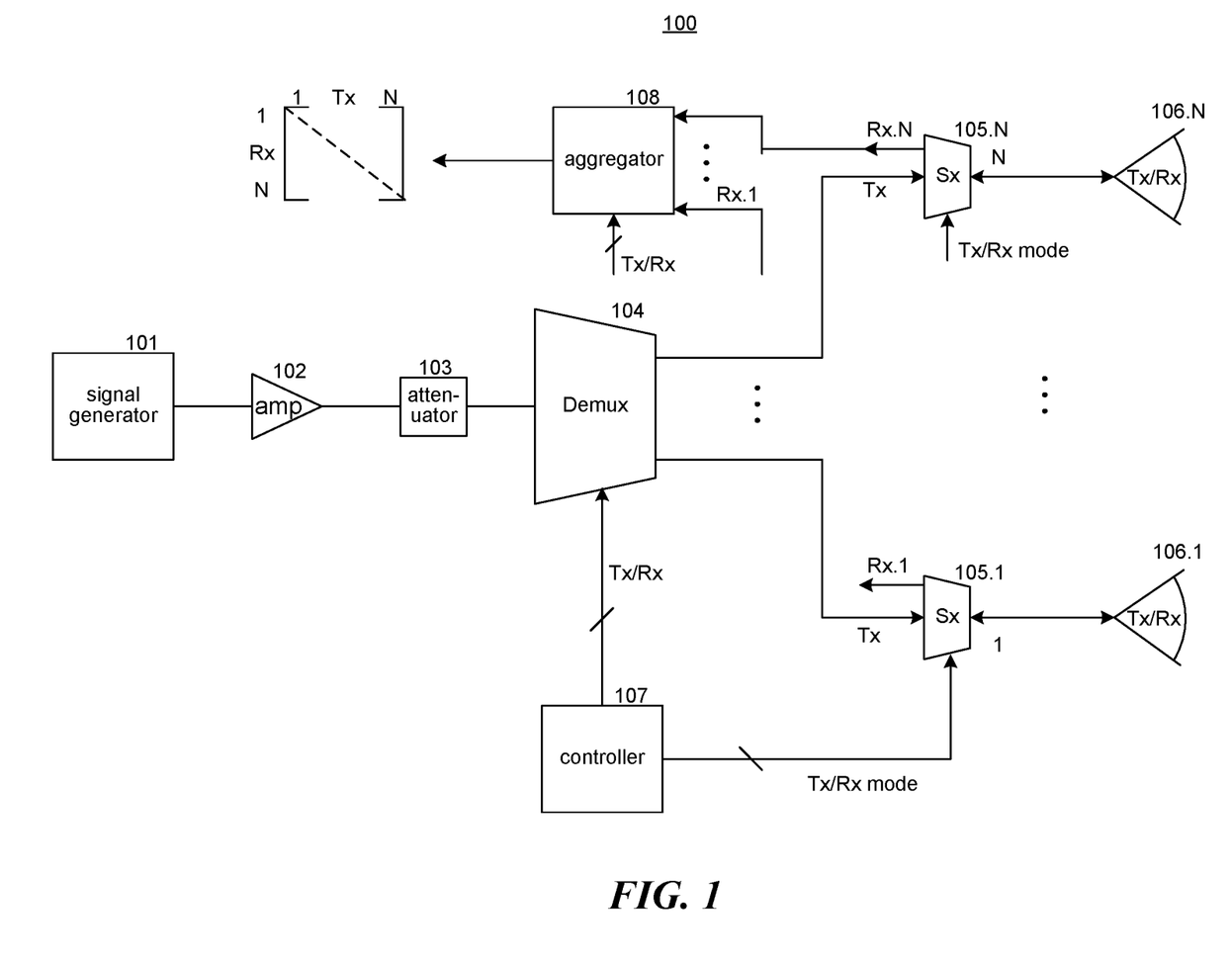
FIG. 1 is a block diagram that illustrates an MMA architecture adapted to operating in a modified multistatic mode of operation.

FIG. 1 is a block diagram that illustrates an MMA architecture adapted to operating in a modified multistatic mode of operation. The MMA architecture includes a signal generator 101, an amplifier 102, an attenuator 103, a demultiplexer 104, switches 105.1-105.N, transceivers 106.1-106.N, a controller 107, and an aggregator 108. The signal generator repeatedly generates a transmit signal to be transmitted by the transceivers. The amplifier and attenuator are tunable to adjust the power of the transmit signal. The demultiplexer inputs the transmit signals from the signal generator and a transceiver selection signal from the controller and directs the transmit signal to the selected transceiver. Each switch inputs a transceiver mode signal from the controller indicating a transmit mode to transmit the transmit signal or a receive mode to receive a return signal via the connected transceiver. To implement a modified multistatic mode, the controller provides transceiver selection signals to the demultiplexer to select the transceivers in sequence. For each selected transceiver, the controller provides a transmit mode signal to the selected transceiver and a receive mode signal to the other transceivers. Thus, for each transceiver that transmits, return signals are collected by the other transceivers. The aggregator inputs the transceiver selection signal from the controller and collects the return signals received by the transceivers other than the transceiver indicated by the transceiver selection signal. The MMA architecture may employ an equivalent-time sampling technique to collect the return signals. With such a technique, the signal generator may generate the same transmit signal a multitude of times, sampling the waveform at different points until the entire transmit waveform has been reconstructed. For example, a radar impulse waveform could be approximated by 512 samples for each transceiver. When the controller provides a transceiver selection signal to the demultiplexer, the transmit signal is sent to and transmitted by the selected transceiver 512 times. The other transceivers receive an equivalent-time sample of that signal that, after 512 pulses completes the desired waveform. The aggregator outputs the equivalent-time sampled return signals as an N-by-N matrix. The diagonal of the matrix contains null values because the return signal received by a transceiver that is transmitting is not used when in the modified multistatic mode. When the matrix is processed to identify objects, the values of the diagonals may be set to a value, for example, based on the return signals received by adjacent transceivers.

Figure 2:
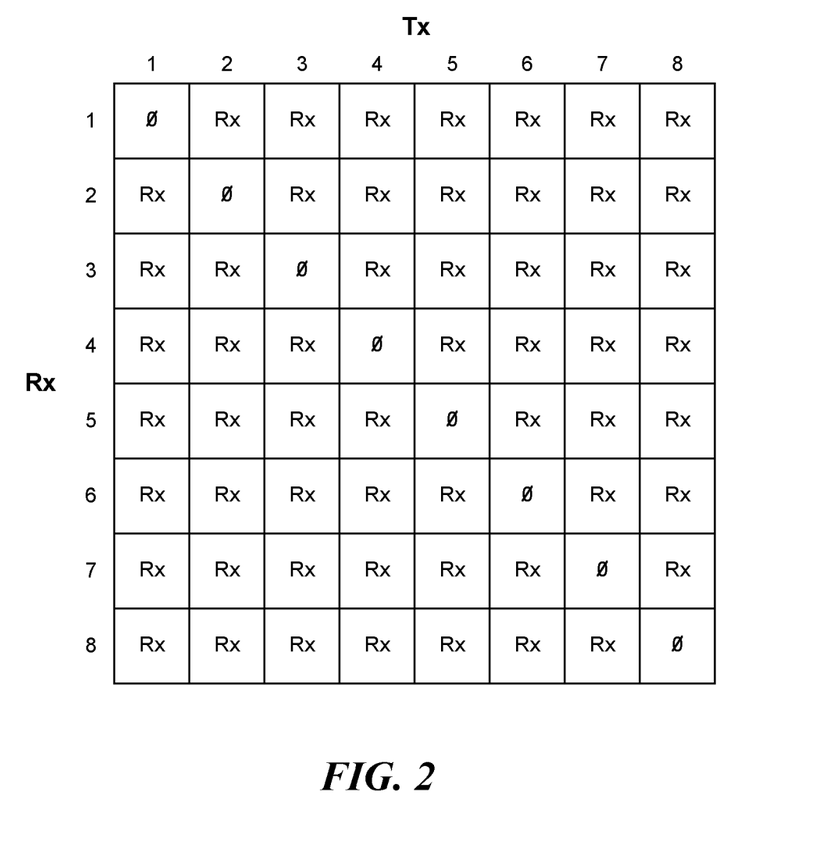
FIG. 2 illustrates a matrix of return signals.

FIG. 2 illustrates a matrix of return signals. The matrix is 8-by-8 representing an MMA architecture with 8 transceivers. The columns represent transceivers when transmitting, and the rows represent transceivers when receiving. For example, when transceiver 1 is transmitting, the column for transceiver 1 includes a null value for that transceiver and the return signal received by the other transceivers. Techniques for processing a matrix of return signals are described in U.S. Pat. No. 8,766,845 that was issued on Jul. 1, 2014, is entitled "Object Detection with a Multistatic Array using Singular Value Decomposition," and is assigned to Lawrence Livermore National Security, LLC, which is hereby incorporated by reference. As described above, the processing of such a matrix with null values provides acceptable object detection results in many applications.

Figure 3:
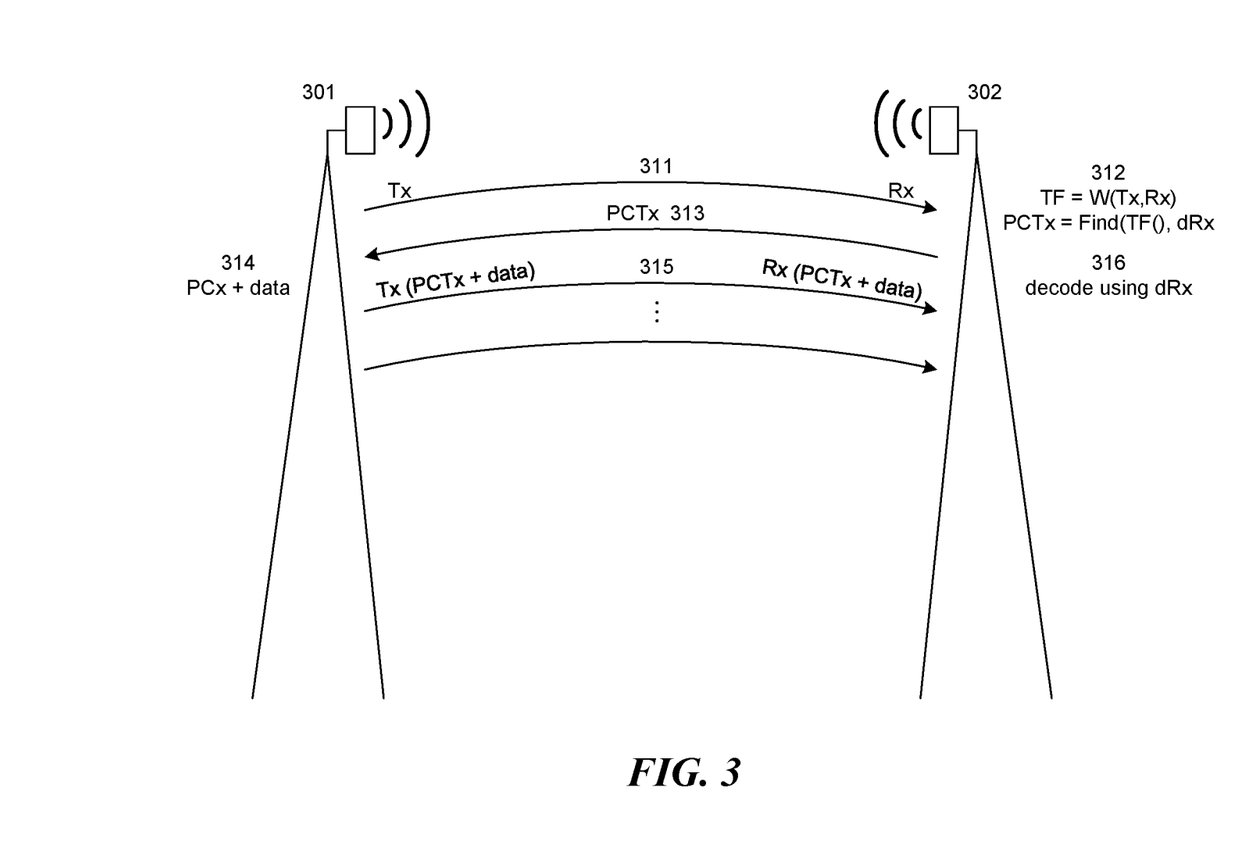
FIG. 3 illustrates operation of a pre-compensation system for cellular communications.

FIG. 3 illustrates operation of a pre-compensation system for cellular communications. Antennas 301 and 302 are in communications range. Antenna 301 initiates communications with antenna 302. The controller for each antenna stores the signature of a calibration transmit signal Tx to be transmitted by antenna 301. Initially, antenna 301 transmits 311 the calibration transmit signal Tx that is received 311 by antenna 302 as a calibration receive signal Rx. The calibration receive signal Rx represents the calibration transmit signal degraded by environmental conditions. The controller for antenna 302 then generates 312 a PC transmit signal PCTx. The PC system may generate a PC transmit signal by first applying a Weiner filter estimation technique to the calibration transmit signal and the calibration receive signal to generate a transfer function. The PC system then identifies the PC transmit signal that when input to the transfer function results in an output that matches the desired receive signal. Antenna 302 then transmits 313 the PC transmit signal to antenna 301. After receiving the PC transmit signal, antenna 301 encodes 304 data using the PC transmit signal and transmits 315 the encoded PC transmit signal (PCTx+ data) to antenna 302. The received encoded PC transmit signal that is received by antenna 302 is also degraded by environmental conditions such that the received encoded PC transmit signal is an approximation of the desired receive signal encoded with the data (Tx+data). Antenna 302 can then decode the encoded data based on the signature of the desired receive signal.

Figure 4:
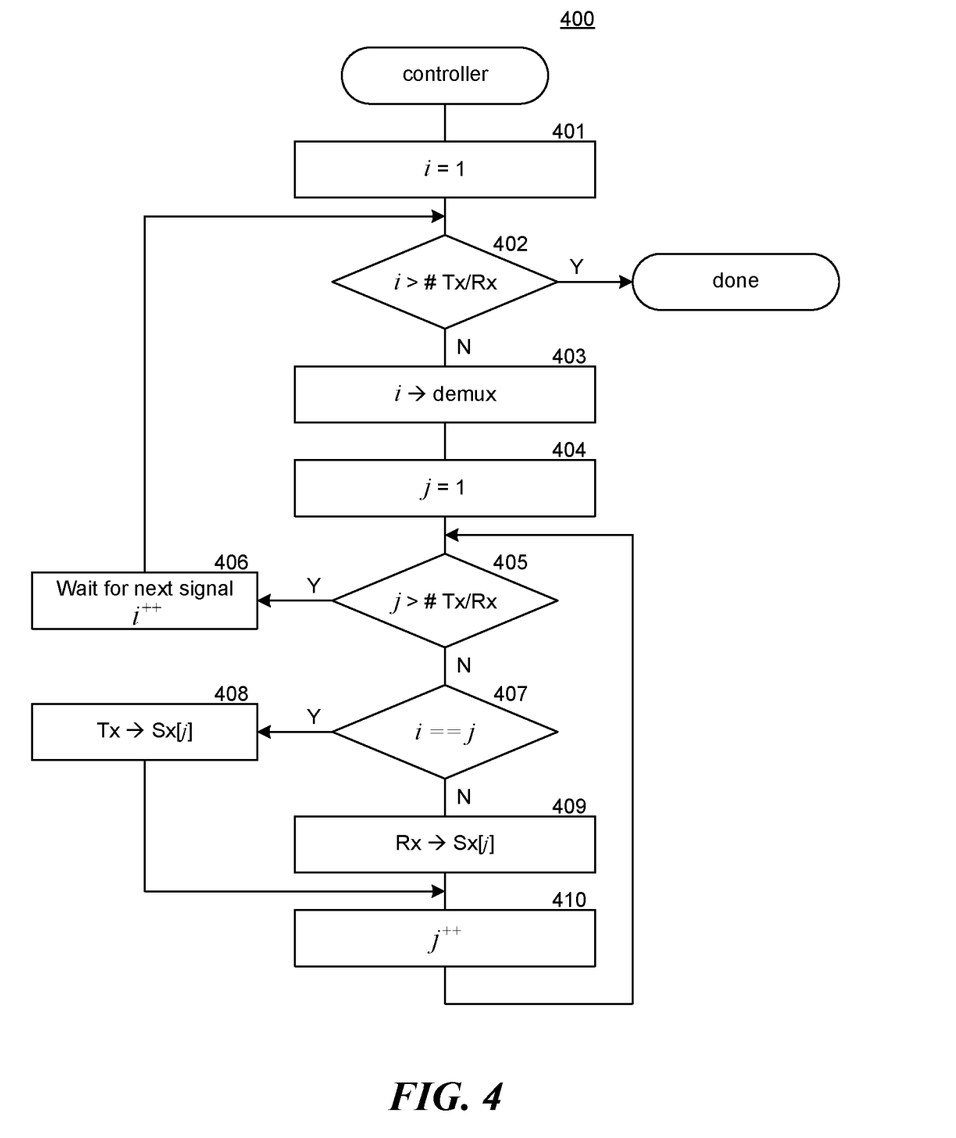
FIG. 4 is a flow diagram that illustrates the overall functional processing of the controller of the MMA system in some embodiments.

FIG. 4 is a flow diagram that illustrates the overall functional processing of the controller of the MMA system in some embodiments. The controller 400 may be implemented using a processor, a field programmable gate array, application-specific integrated circuit, discrete logic and so on. The controller may receive a notification each time a series (e.g., 512) of transmit signals are generated for transmission by a single transceiver. The controller may include hardware to send in parallel a transceiver selection signal to the demultiplexer and aggregator, a transmit mode signal to the selected transceiver, and a receive mode signal to the other transceivers. In the following, the sending of the transceiver selection signal and the transmit/receive mode signals are described as being performed serially, but the controller may include logic to send the signals in parallel. In block 401, the controller selects the first transceiver i. In blocks 402-410, the controller loops selecting the transceivers in sequence and sending transceiver selection signals to the demultiplexer and transmit/receive mode signals to switches for the transceivers. In decision block 402, if all the transceivers have already been selected, then the controller completes a round of transmitting the transmit signals via each transceiver, else the controller continues at block 403. In block 403, the controller sends a transceiver selection signal to the demultiplexer indicating the selected transceiver i. In blocks 404, the component selects a switch j. In decision block 405, if all the switches have already been selected for the selected transceiver i, then the controller continues at block 406, else the controller continues at block 407. In block 406, the controller waits for a signal indicating that the transmission of the transmit signal for the selected transceiver has completed (e.g., sent 512 times by the signal generator). The controller then selects the next transceiver i and loops to block 402 to process the newly selected transceiver. In decision block 407, if the selected switch is associated with the selected transceiver, then the controller continues at block 408, else the controller continues at block 409. In block 408, the controller sends a transmit mode signal to the selected switch and continues at block 410. In block 409, the controller sends a receive mode selection to the selected switch. In block 410, the controller selects the next switch and loops to block 405.

Figure 5:
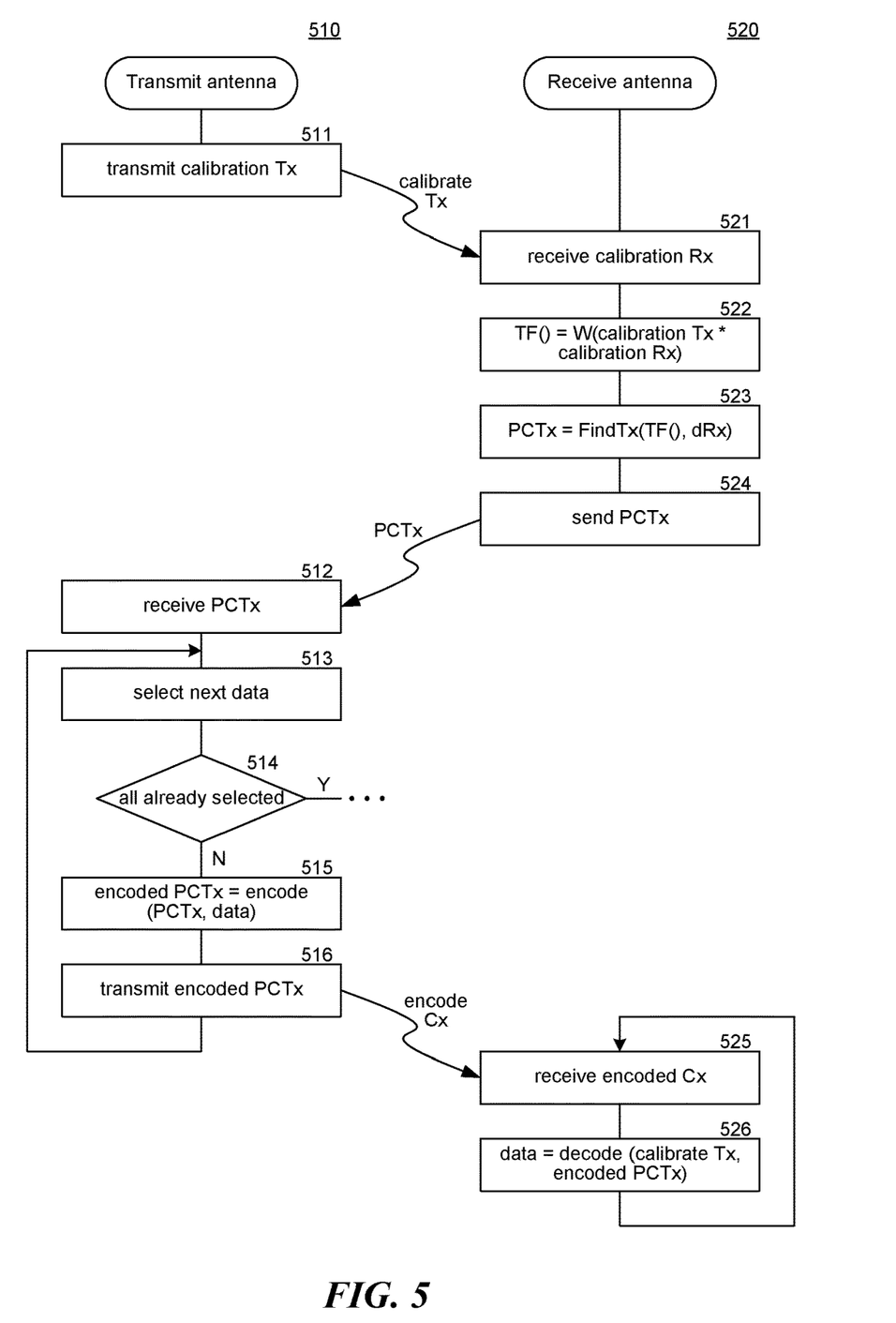
FIG. 5 is a flow diagram that illustrates the processing of a transmit antenna controller and a receive antenna controller of the PC system when the receive antenna controller generates the PC transmit signal in some embodiments.

FIG. 5 is a flow diagram that illustrates the processing of a transmit antenna controller and a receive antenna controller of the PC system when the receive antenna controller generates the PC transmit signal in some embodiments. A transmit antenna controller 510 sends a calibration transmit signal to a receive antenna 520, receives a PC transmit signal from the receive antenna, and subsequently transmits data encoded using the PC transmit signal. In block 511, the transmit antenna controller transmits the calibration transmit signal to the receive antenna. In block 521, the receive antenna controller receives the corresponding calibration receive signal representing a degraded calibration transmit signal. In block 522, the receive antenna controller generates a transfer function by applying Weiner filter estimation to the calibration transmit signal and the calibration receive signal. In block 523, the receive antenna controller finds a PC transmit signal PCTx that when input to the transfer function generates the desired receive signal dRx. In block

524, the receive antenna controller sends the PC transmit signal to the transmit antenna. In block 512, the transmit antenna controller receives the PC transmit signal. In block 513, the transmit antenna controller selects the next data to send to the receive antenna. In decision block 514, if all the data has already been selected, then the transmit antenna controller completes its sending of data, else the transmit antenna controller continues at block 515. In block 515, the transmit antenna controller generates an encoded PC transmit signal that is encoded with the data. In block 516, the transmit antenna control transmits the encoded PC transmit signal to the receive antenna and then loops to block 513 to select the next data to send. In block 525, the receive antenna controller receives the corresponding encoded PC receive signal that has been degraded by environmental conditions. In block 526, the receive antenna controller decodes the data of the encoded PC receive signal using the desired receive signal.

Figure 6:
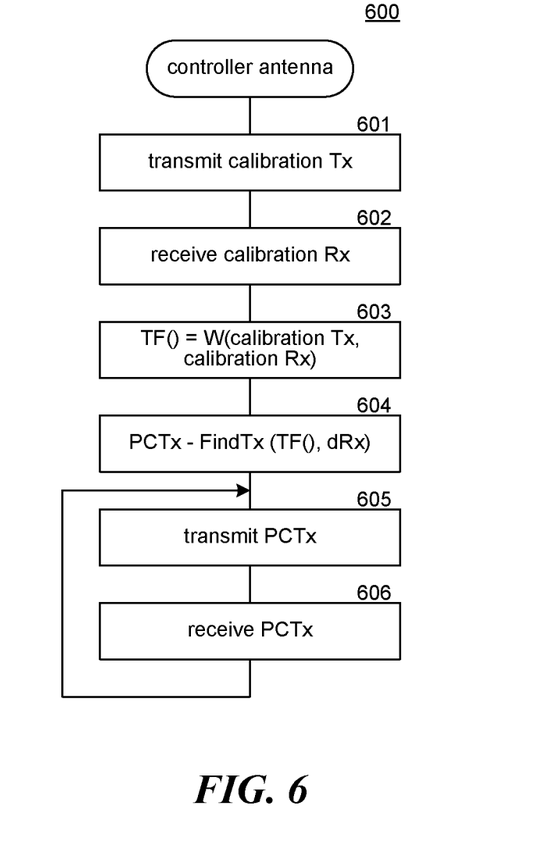
FIG. 6 is a flow diagram that illustrates the processing of an antenna controller that generates a PC transmit signal in some embodiments.

FIG. 6 is a flow diagram that illustrates the processing of an antenna controller that generates a PC transmit signal in some embodiments. The antenna controller 600 transmits a calibration transmit signal, receives a corresponding calibration return signal, generates a PC transmit signal based on the calibration transmit signal, the corresponding calibration return signal, and a desired return signal. The transmit antenna controller subsequently uses the PC transmit signal for transmissions. In block 601, the controller transmits a PC transmit signal. In block 602, the controller receives the corresponding calibration return signal. In block 603, the controller generates a transfer function based on the calibration transmit signal and the calibration return signal. In block 604, the controller finds a PC transmit signal that when input to the transfer function generates a desired return signal. If the antenna controller is deployed with an array of transceivers (e.g., a GPR system), the antenna controller may generate a PC transmit signal for each transceiver. When a transceiver transmits a calibration transmit signal, a calibration return signal may be received by each transceiver. The antenna controller can then determine a calibration return signal to use to generate the transfer function by, for example, selecting one of the calibration return signals, taking an average of the calibration return signal, or applying another statistical technique to generate a calibration return signal. In blocks 605-606, the controller loops transmitting the PC transmit signal and receiving a PC return signal. In block 605, the controller transmits the PC transmit signal. In block 606, the controller receives the PC return signal and stores the PC return signal for image processing using the desired return signal. The controller then loops to block 605 to again transmit the PC transmit signal.

The processing of the described systems may be implemented by programming a computing device that includes a central processing unit and memory. The programs may be stored on computer-readable media include computer-readable storage media and data transmission media. The computer-readable storage media include memory and other storage devices that may have recorded upon or may be encoded with computer-executable instructions or logic that implement the described systems. The data transmission media is media for transmitting data using signals or carrier waves (e.g., electromagnetism) via a wire or wireless connection. Various functions of the described systems may also be implemented on devices using discrete logic or logic embedded as an application-specific integrated circuit. The matrices of return signals may be processed locally by the UAV to detect objects or transmitted to a computing device for remote detection of objects.

The following paragraphs describe various embodiments of aspects of the MMA and PC systems. An implementation of the systems may employ any combination of the embodiments. The processing described below may be performed by a computing device with a processor that executes computer-executable instructions stored on a computer-readable storage medium, discrete logic components, and so on that implements the systems.

In some embodiments, a method performed by an electronics system associated with a first signal system having a radar antenna. The method transmits the method comprising: a calibration transmit signal via the radar antenna. The method receives a calibration receive signal that is different from the calibration transmit signal based at least in part on degradation of the calibration transmit signal as it travels from the first signal system to a destination. The method identifies a transfer function that maps the calibration transmit signal to the calibration receive signal. The method identifies a pre-compensated transmit signal that when input to the transfer function outputs a desired receive signal. The method transmits the pre-compensated transmit signal so that a resulting pre-compensated receive signal will approximate the desired receive signal based on a degradation of the pre-compensated transmit signal as it travels from the first signal system to a destination. In some embodiments, the calibration receive signal is a reflection of the calibration transmit signal. In some embodiments, the calibration receive signal represents multiple reflections of the calibration transmit signal from multiple reflection surfaces. In some embodiments, the calibration receive signal is further different from the calibration transmit signal based on degradation of the calibration transmit signal resulting from the reflection. In some embodiments, the calibration receive signal is further different from the calibration transmit signal based on degradation of the calibration transmit signal as it travels from the destination to the first signal system. In some embodiments, the calibration transmit signal is a ground penetrating radar signal. In some embodiments, the calibration receive signal is received by a second signal system and then transmitted by the second signal system to the first signal system.

In some embodiments, a method performed by an electronics system associated with a first signal system having a radar antenna is provided. The method receives, via the radar antenna from a second signal system, a calibration receive signal corresponding to a calibration transmit signal transmitted by the second signal system via a radar antenna. The calibration receive signal is different from the calibration transmit signal based at least in part on degradation of the calibration transmit signal as it travels from the second signal system to the first signal system. The method identifies a transfer function that maps the calibration transmit signal to the calibration receive signal. The method identifies a pre-compensated transmit signal that when input to the transfer function outputs a desired receive signal. The method transmits, via the radar antenna to the second signal system, the pre-compensated transmit signal so that the second signal system can transmit the pre-compensated transmit signal via a radar antenna wherein a pre-compensated receive signal received via the radar antenna of the first signal system approximates the desired receive signal based at least in part on degradation of the pre-compensated transmit signal as it travels from the first signal system to the second signal system. In some embodiments, the first signal system and the second signal system are part of a cellular communications network.

In some embodiments, a first signal system interfacing with a radar transmitter and receiver pair. The first signal system includes a component that controls transmitting a first signal via the radar transmitter. The first signal system includes a component that controls receiving a second signal via the radar receiver, the second signal corresponding to a degradation of the first signal during transmission. The first signal system includes a component that controls identifying a transfer function that maps the first signal to the second signal and identifies a third signal when input to the transfer function outputs a fourth signal. The first signal system includes a component that controls transmitting the third signal via the transmitter so that the third signal is received as an approximation of the fourth signal based on degradation that is similar to the degradation of the first signal. In some embodiments, the transmitter and receiver pair is a transceiver with a single antenna. In some embodiments. the transmitter and receiver pair includes a transmit antenna and a receive antenna. In some embodiments, the second signal is a reflection based on the first signal. In some embodiments, the first signal is a ground penetrating radar signal. In some embodiments, the second signal is received by a second signal system and then transmitted by the second signal system to the first signal system.

In some embodiments, a signal system for controlling an array of transmitter and receiver pairs to operate in a modified multistatic mode is provided. The first signal system includes a controller that, for each of the transmitter and receiver pairs in sequence, directs the transmitter of that transmitter and receiver pair to transmit a transmit signal and directs receivers of the other transmitter and receiver pairs to acquire a return signal from the transmit signal. The first signal system includes an aggregator that, for each of the transmit signals transmitted by a transmitter, receives a return signal acquired by the receivers. The aggregator further provides the acquired return signals wherein the provided acquired return signals do not include a return signal for each receiver when the transmitter paired with that receiver transmitted the transmit signal. In some embodiments, the transmitter and receiver pairs are transceivers and when a transmitter of a transceiver transmits a transmit signal, the receiver for that transceiver is not directed to receive a return signal for that transmitted signal. In some embodiments, the controller further directs the receiver for the transmitter and receiver pair that transmits the transmit signal to acquire a return signal and wherein the aggregator does not provide the return signals acquired by the receivers of the transmitter and receiver pairs that transmit the transmit signal. In some embodiments, the transmitter and receiver pairs include a separate transmit antenna and receive antenna and wherein the aggregator receives the return signals of the receivers of the transmitter and receiver pairs that transmits the transmit signal and not provide those return signals. In some embodiments, the signal system includes a demultiplexer and, for each transmitter and receiver pair, a switch associated with that transmitter and receiver pair. The demultiplexer inputs the transmit signals and directs the transmit signal to a switch for transmission by the transmitter of the transmitter and receiver pair associated with that switch as directed by the controller. Each switch controls the associated transmitter and receiver pair to transmit or receive as directed by the controller. In some embodiments, the signal system is a ground penetrating radar system. In some embodiments, the controller includes logic to direct the receivers in parallel. In some embodiments, the signal system does not include a demultiplexer and the signal is sent to the switches in parallel. In some embodiments, the signal system is mounted on an autonomous vehicle. In some embodiments, the signal system does not include precise timing electronics to switch an antenna of a transceiver that transmits a transmit signal to receive a return signal of that transmitted transmit signal.

In some embodiments, a method performed by a ground penetrating radar system mounted on an unmanned aerial vehicle. The ground penetrating radar system includes radar transceivers. The method transmits a transmit signal serially by each transceiver. For each transceiver that transmits a transmit signal, the method receives a return signal acquired by each transceiver except for a return signal for the transceiver that transmits the transmit signal. In some embodiments, the return signal is acquired by the transceiver that transmits the corresponding transmit signal but is not used in subsequent processing of the return signals. In some embodiments, the ground penetrating radar system does not include precise timing electronics to switch an antenna of a transceiver that transmits a transmit signal to receive a return signal of that transmitted transmit signal.

In some embodiments, a system for controlling an array of transceivers, each transceiver associated with an antenna. The system includes a demultiplexer that, in response to a transceiver selection signal indicating a transceiver, directs an input to an output for that transceiver. The system includes, for each of the transceivers, a switch that in response to a transmit mode signal indicating to transmit, directs an input connected to the output of the demultiplexer for that transceiver to a transmit output for the antenna of that transceiver, and in response to a receive mode signal indicating to receive, directs an input from the antenna of that transceiver to a receive output. The system further includes a controller to, for each transceiver, send a transceiver selection signal for that transceiver to the demultiplexer, and send a transmit mode signal to the switch for that transceiver and, for transceivers other than that transceiver, send a receive mode signal to the switches for those transceivers. In some embodiments, the system and the array of transceivers is mounted on an unmanned aerial vehicle. In some embodiments, the system further includes a signal generator to generate the transmit signals that are input to the demultiplexer. In some embodiments, the signal generator generates multiple transmit signals for each transceiver and employs equivalent-time sampling of the signals. In some embodiments, the system further includes an amplifier and attenuator for tuning the generated transmit signal prior to input to the demultiplexer. In some embodiments, the system further includes an aggregator that receives the return signals and provides a matrix of return signals with a return signal for each transceiver other than the transceiver that transmits the corresponding transmits signal wherein the return signal for the transceiver that transmits is set to a null value.

From the foregoing, it will be appreciated that specific embodiments of the technology have been described herein for purposes of illustration but that various modifications may be made without deviating from the scope of the invention. For example, the MMA system and the PC system may be deployed in a variety of radar systems. For example, the system may deploy on various type of unmanned vehicles ("UVs") such as UAVs, unmanned underwater vehicles ("UUVs"), unmanned space vehicles ("USVs"), and so on. For example, when deployed in a USV, the system may be used to detect space junk. Accordingly, the invention is not limited except as by the appended claims.

The invention claimed is:

1. A method performed by an electronics system associated with a first signal system having a radar antenna, the method comprising:
transmitting a calibration transmit signal via the radar antenna;
receiving a calibration receive signal that is different from the calibration transmit signal based at least in part on degradation of the calibration transmit signal as it travels from the first signal system to a destination;
identifying a transfer function that maps the calibration transmit signal to the calibration receive signal;
identifying a pre-compensated transmit signal that when input to the transfer function outputs a desired receive signal; and
transmitting the pre-compensated transmit signal so that a resulting pre-compensated receive signal will approximate the desired receive signal based on a degradation of the pre-compensated transmit signal as it travels from the first signal system to a destination.

2. The method of claim 1 wherein the calibration receive signal is a reflection of the calibration transmit signal.

3. The method of claim 2 wherein the calibration receive signal represents multiple reflections of the calibration transmit signal from multiple reflection surfaces.

4. The method of claim 2 wherein the calibration receive signal is further different from the calibration transmit signal based on degradation of the calibration transmit signal resulting from the reflection.

5. The method of claim 1 wherein the calibration receive signal is further different from the calibration transmit signal based on degradation of the calibration transmit signal as it travels from the destination to the first signal system.

6. The method of claim 1 wherein the calibration transmit signal is a ground penetrating radar signal.

7. The method of claim 1 wherein the calibration receive signal is received by a second signal system and then transmitted by the second signal system to the first signal system.

8. A method performed by an electronics system associated with a first signal system having a radar antenna, the method comprising:
receiving, via the radar antenna from a second signal system, a calibration receive signal corresponding to a calibration transmit signal transmitted by the second signal system via a radar antenna, the calibration receive signal being different from the calibration transmit signal based at least in part on degradation of the calibration transmit signal as it travels from the second signal system to the first signal system;
identifying a transfer function that maps the calibration transmit signal to the calibration receive signal;
identifying a pre-compensated transmit signal that when input to the transfer function outputs a desired receive signal; and
transmitting, via the radar antenna to the second signal system, the pre-compensated transmit signal so that the second signal system can transmit the pre-compensated transmit signal via a radar antenna wherein a pre-compensated receive signal received via the radar antenna of the first signal system approximates the desired receive signal based at least in part on degradation of the pre-compensated transmit signal as it travels from the first signal system to the second signal system.

9. The method of claim 8 wherein the first signal system and the second signal system are part of a cellular communications network.

10. A first signal system interfacing with a radar transmitter and receiver pair, the first signal system comprising:
a component that controls transmitting a first signal via the radar transmitter;
a component that controls receiving a second signal via the radar receiver, the second signal corresponding to a degradation of the first signal during transmission;
a component that controls identifying a transfer function that maps the first signal to the second signal and identifies a third signal when input to the transfer function outputs a fourth signal; and
a component that controls transmitting the third signal via the transmitter so that the third signal is received as an approximation of the fourth signal based on degradation that is similar to the degradation of the first signal.

11. The first signal system of claim 10 wherein the transmitter and receiver pair is a transceiver with a single antenna.

12. The first signal system of claim 10 wherein the transmitter and receiver pair includes a transmit antenna and a receive antenna.

13. The first signal system of claim 10 wherein the second signal is a reflection based on the first signal.

14. The first signal system of claim 10 wherein the first signal is a ground penetrating radar signal.

15. The first signal system of claim 14 wherein the second signal is received by a second signal system and then transmitted by the second signal system to the first signal system.

* * * * *